(12) United States Patent
Huang

(10) Patent No.: US 6,729,030 B2
(45) Date of Patent: May 4, 2004

(54) HACKSAW HAVING EASILY OPERATED BLADE TENSION DEVICE

(76) Inventor: Yin Han Huang, P.O. Box 63-99, Taichung (TW), 406

( * ) Notice: Subject to any disclaimer, the term of this patent is extended or adjusted under 35 U.S.C. 154(b) by 58 days.

(21) Appl. No.: 10/173,327

(22) Filed: Jun. 13, 2002

(65) Prior Publication Data

US 2003/0229995 A1 Dec. 18, 2003

(51) Int. Cl.$^7$ ............................................... B27B 21/06
(52) U.S. Cl. ............................................ 30/513; 30/506
(58) Field of Search ......................... 30/506, 507, 513, 30/514, 517

(56) References Cited

U.S. PATENT DOCUMENTS

| | | | |
|---|---|---|---|
| 3,636,997 A | * 1/1972 | Keymer | 30/513 |
| 3,822,731 A | 7/1974 | Keymer | 145/33 A |
| 4,466,471 A | 8/1984 | Thomson | 145/33 A |
| 5,768,788 A | * 6/1998 | Arnold | 30/513 |
| 5,826,344 A | 10/1998 | Phelon et al. | 30/513 |
| 6,134,791 A | 10/2000 | Huang | 30/513 |
| 2003/0056377 A1 | * 3/2003 | Huang | 30/513 |

* cited by examiner

*Primary Examiner*—Hwei-Siu Payer

(57) ABSTRACT

A hacksaw includes a frame having a chamber formed in a rear handle, an arm pivotally secured to the handle for tensioning a saw blade and having a rear oblong hole, a lever pivotally secured to the handle, and a tension rod pivotally secured to the lever and having a lower portion extended through the oblong hole of the arm. A latch has a block slidably received in the handle and has an orifice for slidably receiving the tension rod. A spring may bias the latch to engage with the lever, and may bias the arm away from the handle.

8 Claims, 6 Drawing Sheets

HACKSAW HAVING EASILY OPERATED BLADE TENSION DEVICE

BACKGROUND OF THE INVENTION

1. Field of the Invention

The present invention relates to a hacksaw, and more particularly to a hacksaw including an easily operated blade tension device.

2. Description of the Prior Art

Various kinds of typical hacksaws have been developed and comprise various kinds of blade tension devices for tensioning the saw blades. U.S. Pat. No. 3,822,731 to Keymer, U.S. Pat. No. 4,466,471 to Thomson, U.S. Pat. No. 5,826,344 to Phelon et al., and U.S. Pat. No. 6,134,791 to Huang disclose four of the typical hacksaws, and comprise a rotatable lever for tensioning the saw blade, and a latch for locking the lever.

However, the typical hacksaws comprise a complicated configuration that may not be easily assembled. In addition, most of the latches or the knobs include a tiny volume or area that may not be easily operated by the users.

In addition, some of the latches or knobs of the typical hacksaws may be actuated inadvertently while working, such that the saw blades may have a good chance to be loosened inadvertently while working.

The present invention has arisen to mitigate and/or obviate the afore-described disadvantages of the conventional hacksaws.

SUMMARY OF THE INVENTION

The primary objective of the present invention is to provide a hacksaw including an easily operated blade tension device, In accordance with one aspect of the invention, there is provided a hacksaw comprising a frame including a beam having a front portion and a rear portion, a leg and a handle extended downward from the front portion and the rear portion of the beam respectively, the handle including an upper portion and a lower portion and including a chamber formed therein, an arm including a front portion pivotally secured to the lower portion of the handle, and including a rear portion having an oblong hole formed therein, a saw blade detachably coupled between the leg and the front portion of the arm, a lever including an upper portion pivotally secured to the upper portion of the handle with a pivot shaft, and including a lower portion, and including an upper and front portion, a tension rod including an upper portion pivotally secured to the upper and front portion of the lever with a pivot pole, and including a lower portion extended through the oblong hole of the arm and engageable with the rear portion of the arm, the tension rod being movable up and down relative to the handle by rotating the lever inward and outward of the chamber of the handle about the pivot shaft, a latch including a block slidably received in the chamber of the handle, and having an orifice formed therein for slidably receiving the tension rod, and means for biasing the latch to engage with the lever and to retain the lever in the chamber of the handle.

The biasing means includes a spring engaged between the block and the rear portion of the arm.

A stop may further be provided and attached onto the tension rod and engageable with the block of the latch, for limiting the block of the latch to move relative to the tension rod.

The handle includes a pair of plates for defining the chamber thereof between the plates, and means for guiding the latch to move relative to the handle.

The guiding means includes at least one rail provided on the plates, and at least one channel formed in the block for slidably receiving the at least one rail.

The lower portion of the lever includes a lock notch formed therein, the latch includes an upper portion having a catch provided thereon for engaging with the lock notch of the lever.

The lower portion of the lever may also include a lock tongue provided thereon, the latch includes an upper portion having a lock recess formed therein for receiving the lock tongue of the lever.

The lower portion of the tension rod includes an outer thread formed thereon, and a fastener threaded to the outer thread of the tension rod and engageable with the rear portion of the arm.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
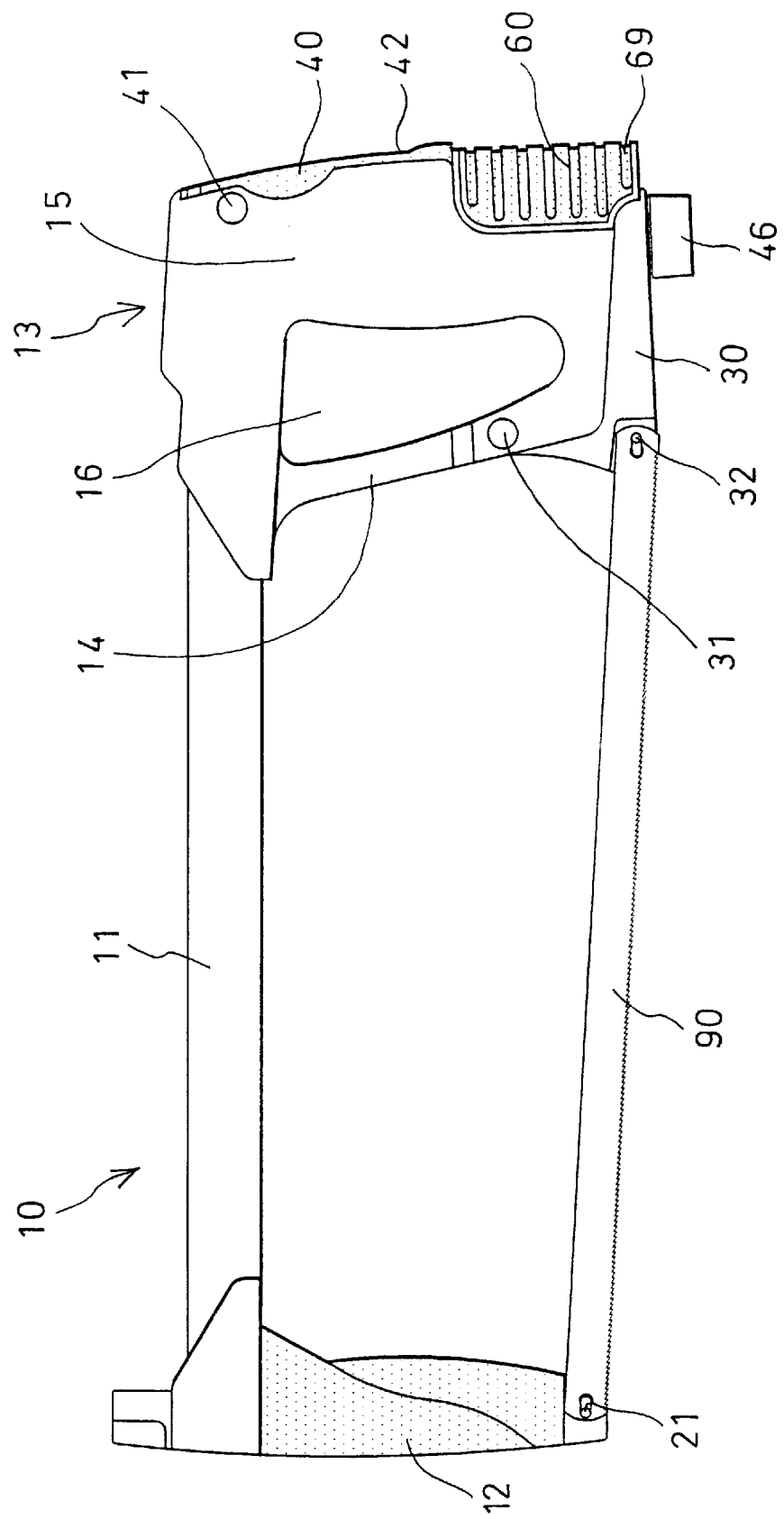
FIG. 1 is a side view of a hacksaw in accordance with the present invention.
Figure 2:
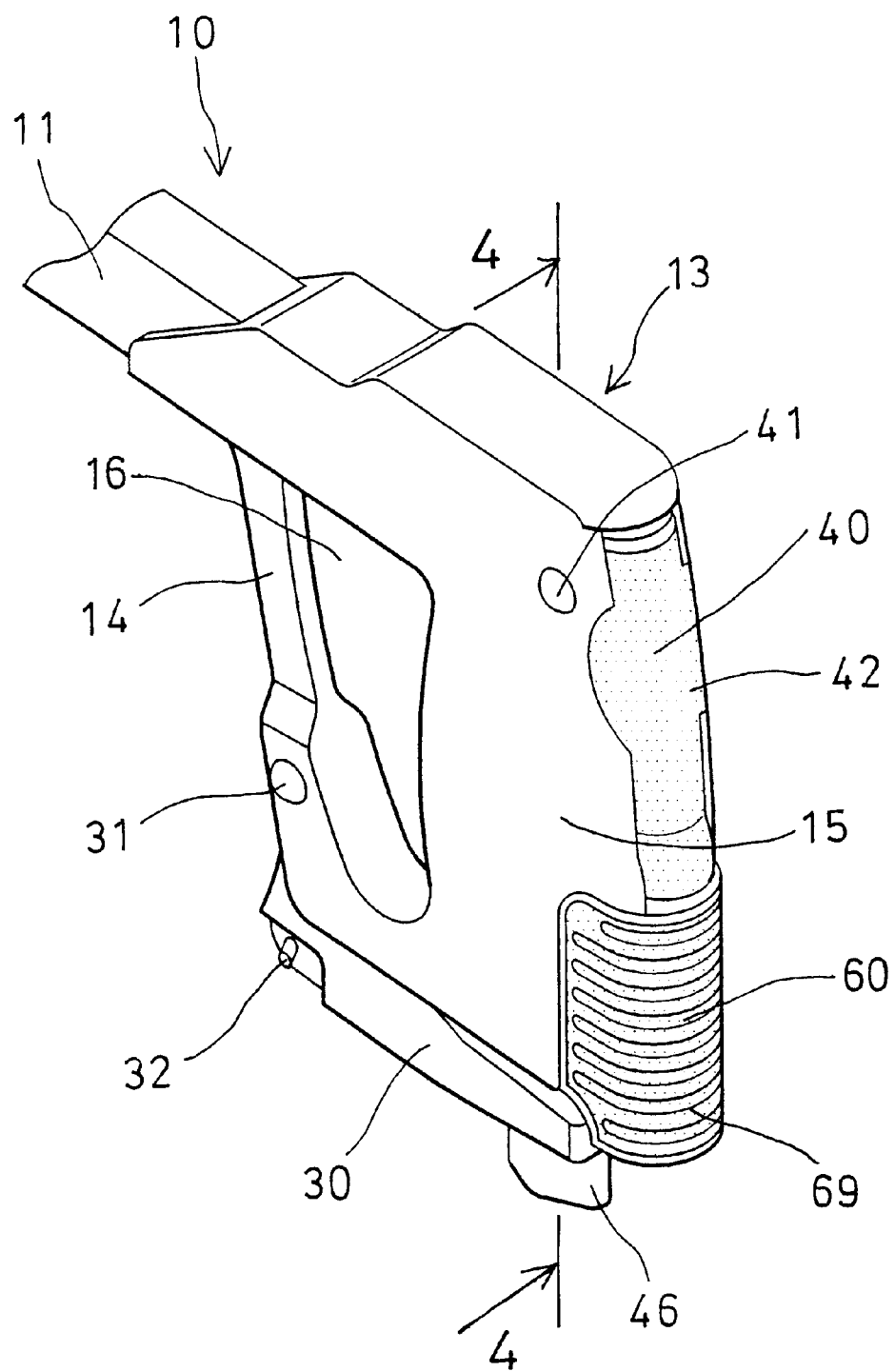
FIG. 2 is a partial perspective view showing a handle portion of the hacksaw.
Figure 3:
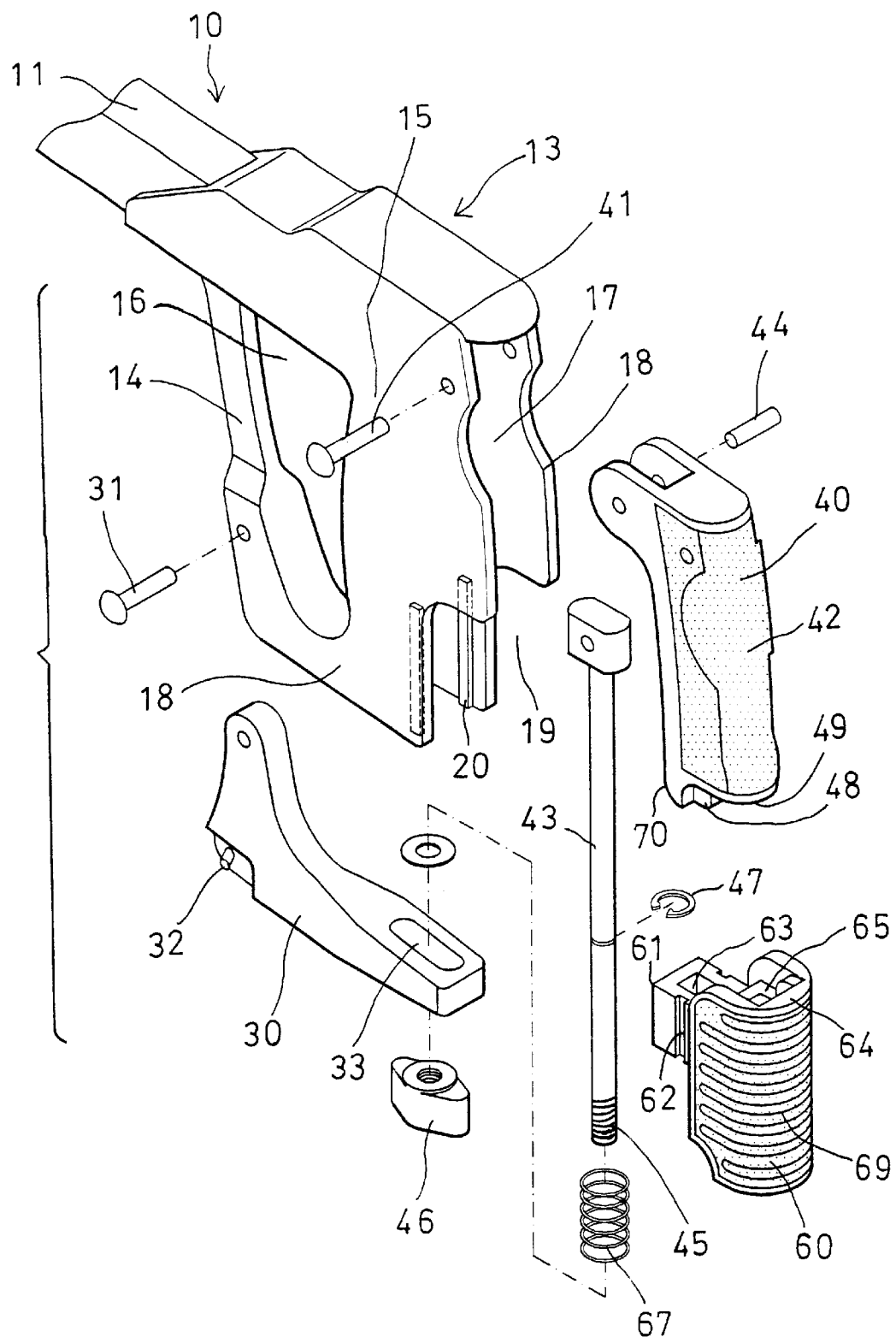
FIG. 3 is an exploded view of the handle portion of the hacksaw.
Figure 4:
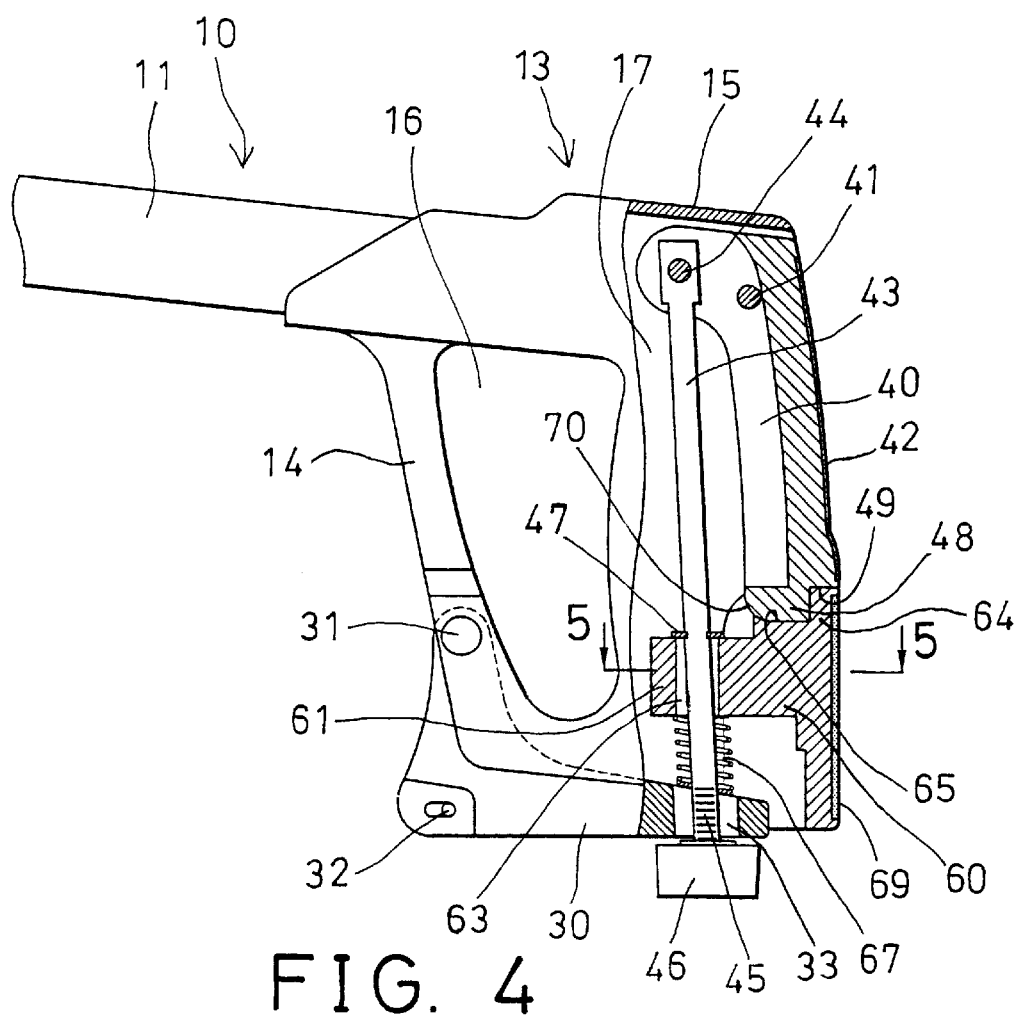
FIG. 4 is a partial cross sectional view taken along lines 4—4 of FIG. 2.
Figure 5:
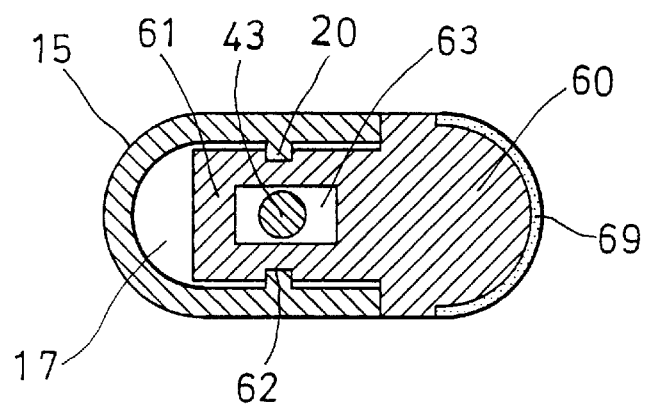
FIG. 5 is a cross sectional view taken along lines 5—5 of FIG. 4.

Referring to the drawings, and initially to FIGS. 1–5, a hacksaw in accordance with the present invention comprises a frame 10 including a horizontal beam 11 having a front leg 12 and a rear handle 13 extended downward from the front and the rear portions thereof respectively. A typical hacksaw blade 90 extends across the open area defined between the front leg 12 and the rear handle 13 and includes a serrated bottom edge.

The handle 13 includes a limb 14 and a hand grip 15 having an opening 16 formed therebetween, through which a user's fingers can extend. The hand grip 15 preferably includes an ergonomic configuration to enhance user comfort, and includes a chamber 17 formed therein, and formed or defined by a pair of plates 18.

The plates 18 each preferably includes a notch 19 formed in the lower or bottom portion thereof, and each includes a vertical rail 20 provided thereon or inwardly extended into the chamber 17 of the hand grip 15 for guiding purposes.

A rocker arm 30 is rotatably or pivotally secured to the lower portion of the handle 13, such as the lower portion of the limb 14 with a pivot axle 31, and includes a pin 32 provided in the front portion thereof for coupling or hooking to the rear end of the saw blade 90.

The front end of the saw blade 90 may be hooked or coupled to the lower pin 21 that is provided on the lower portion of the front leg 12. The rear portion of the rocker arm 30 includes an oblong hole 33 formed therein. The arm 30 may be rotated toward or inward the lower portion of the handle 13 and/or the hand grip 15 for tensioning the saw blade 90.

A lever 40 includes an upper portion pivotally or rotatably secured to the handle 13 or the hand grip 15 with a pivot shaft 41, and is extendible into and outward of the chamber 17 of the hand grip 15. The lever 40 may be provided with a serrated or knurled surface 42 to facilitate positive gripping.

The above described structure is typical and has been disclosed in U.S. Pat. No. 4,466,471 to Thomson, which may be taken as a reference for the present invention.

A tension rod 43 is received in the chamber 17 of the hand grip 15, and includes an upper portion pivotally or rotatably secured to the front or upper portion of the lever 40 with a pivot pole 44, and includes a lower portion extendible through the oblong hole 33 of the arm 30.

The lower portion of the tension rod 43 includes an outer thread 45 formed thereon. A lock nut or a fastener 46 may be threaded with the outer thread 45 of the tension rod 43 and may be engaged with the arm 30 for locking the rear portion of the arm 30 to the handle 13 or the hand grip 15.

A clamping ring or a stop 47 may be optionally provided and engaged onto the middle portion of the tension rod 43. The lever 40 includes a lock tongue 48 and/or a lock notch 49 formed or provided in the lower or bottom portion thereof.

A latch 60 is slidably engaged in the handle 13 or the hand grip 15, such as in the notches 19 of the hand grip 15, and includes a block 61 slidably engaged in the chamber 17 of the hand grip 15, and having one or more channels 62 formed therein for slidably receiving the rails 20, and for guiding the latch 60 to move up and down along the rails 20, relative to the hand grip 15 and the handle 13.

The latch 60 or the block 61 includes an orifice 63 formed therein for slidably receiving the tension rod 43, and includes a catch 64 and/or a lock recess 65 formed or provided on the upper portion thereof for receiving or for engaging with the lock notch 49 and/or the lock tongue 48 of the lever 40, and for retaining the lever 40 in the chamber 17 of the hand grip 15.

A spring 67 may be provided and engaged onto the tension rod 43, and engaged between the arm 30 and the block 61 of the latch 60, for biasing the catch 64 and/or the lock recess 65 of the latch 60 to engage into or to receive the lock notch 49 and/or the lock tongue 48 of the lever 40, and to lock the lever 40 to the hand grip 15 or the handle 13.

The clamping ring or the stop 47 may be optionally provided and engaged with the block 61 of the latch 60 for limiting the latch 60 and the block 61 to move relative to the tension rod 43 and the hand grip 15. The latch 60 may also be provided with a serrated or knurled surface 69 to facilitate positive gripping.

Figure 6:
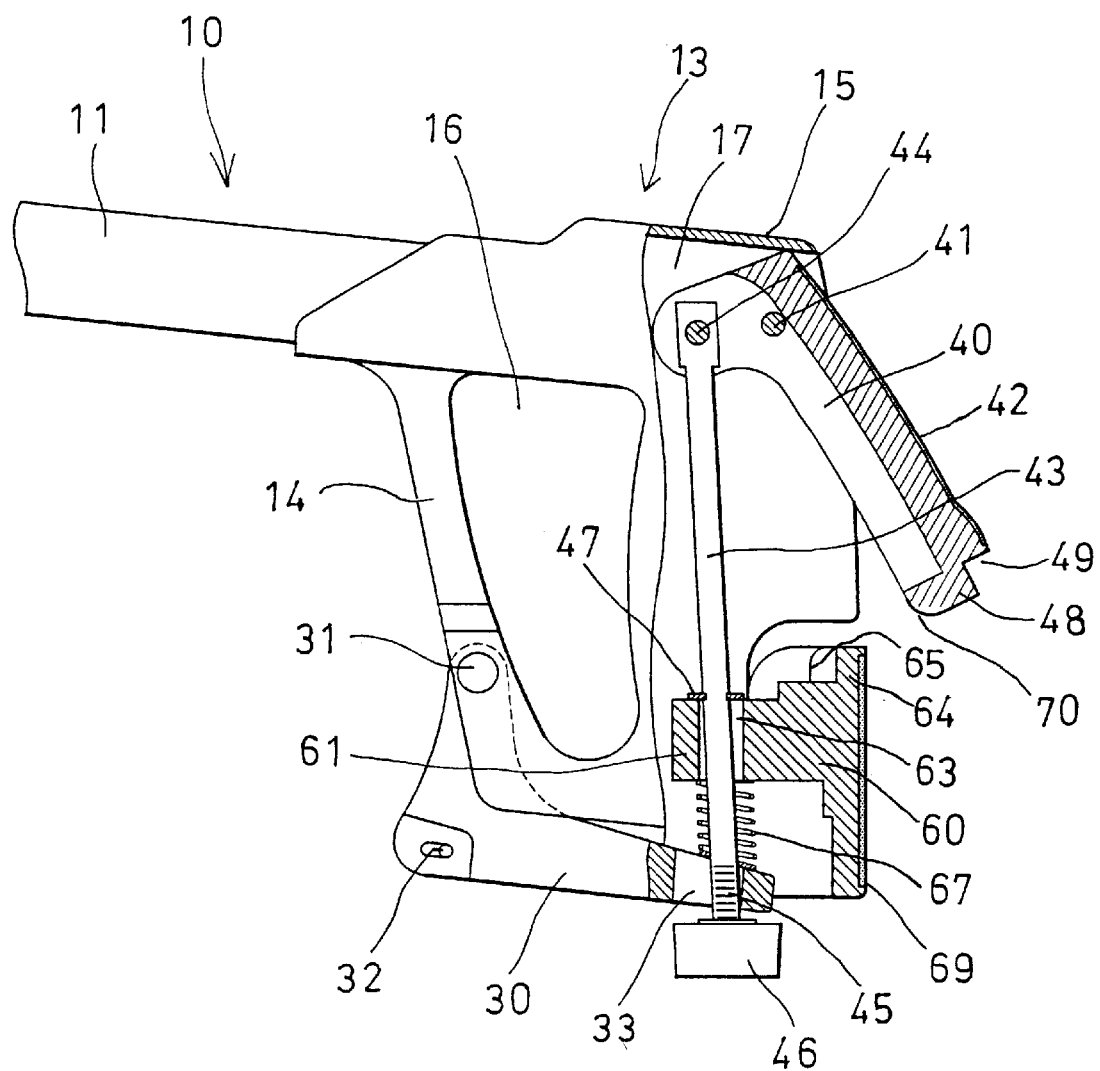
FIGS. 6, 7 are partial cross sectional views similar to FIG. 4, illustrating the operation of the hacksaw.

In operation, as shown in FIG. 6, the catch 64 and/or the lock recess 65 of the latch 60 may be disengaged from the lock notch 49 and/or the lock tongue 48 of the lever 40, in order to unlock the lever 40 relative to the hand grip 15 or the handle 13, by moving the latch 60 downward or against the spring 67.

When the lever 40 is rotated outward of the hand grip 15, the tension rod 43 is movable downward for releasing the arm 30 and the saw blade 90, and for allowing the saw blade 90 to be disengaged from or engaged onto the pins 21, 32 of the leg 12 and the arm 30.

When the lever 40 is rotated into the chamber 17 of the hand grip 15, the tension rod 43 may be moved upward by the lever 40, in order to force or to tension the arm 30 and thus the saw blade 90, and so as to lock the saw blade 90 to the leg 12 and the handle 13 of the frame 10 with the arm 30.

Figure 7:
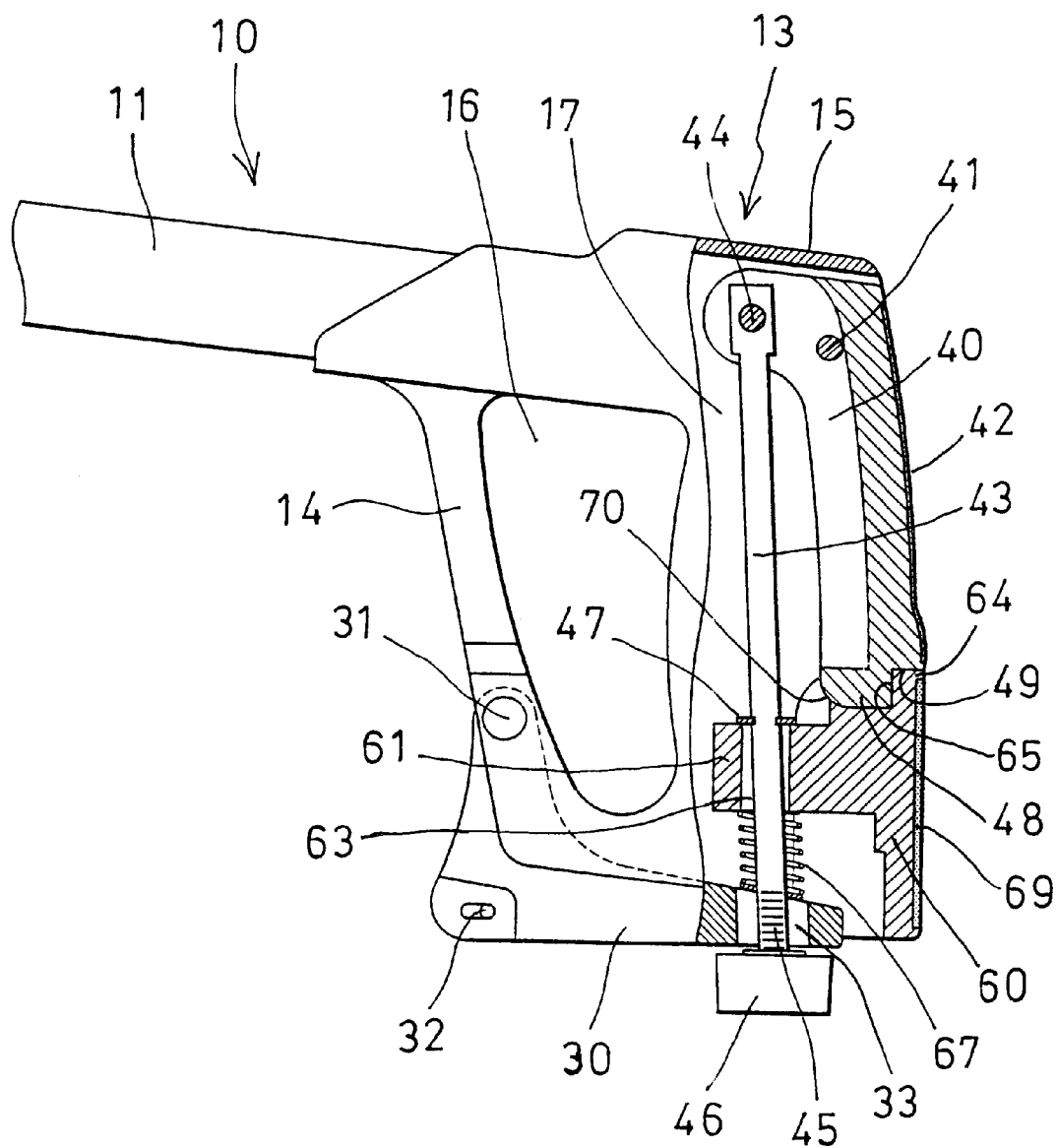

As shown in FIG. 7, the latch 60 may be downward or away from the lever 40 against the spring 67, which may then bias the catch 64 and/or the lock recess 65 of the latch 60 to engage with the lock notch 49 and/or the lock tongue 48 of the lever 40, when the latch 60 is released, in order to lock the lever 40 to the hand grip 15 or the handle 13.

It is preferable that the lever 40 includes a curved or rounded surface 70 formed or provided on the lower and front portion thereof (FIGS. 3, 4, 6, 7) for engaging with and for forcing or for moving the latch 60 downward or away from the lever 40 against the spring 67, and for allowing the catch 64 and/or the lock, recess 65 of the latch 60 to be engaged with the lock notch 49 and/or the lock tongue 48 of the lever 40 automatically without moving the latch 60 downward against the spring 67.

The lock nut 46 may be threaded with or unthreaded relative to the outer thread 45 of the tension rod 43, in order to adjust the tension of the saw blade 90.

It is to be noted that the spring 67 may both bias the arm 30 to rotate or to move away from the hand grip 15, in order to loosen the saw blade 90, and may also bias the catch 64 and/or the lock recess 65 of the latch 60 to engage with the lock notch 49 and/or the lock tongue 48 of the lever 40 simultaneously. The spring 67 may thus form a means or a device for biasing the catch 64 and/or the lock recess 65 of the latch 60 to engage with the lock notch 49 and/or the lock tongue 48 of the lever 40.

The fastener 46 may also be formed integral with the lower portion of the tension rod 43 as those shown in U.S. Pat. No. 4,466,471 to Thomson, and may also be provided to force and to retain or to lock the arm 30 to the hand grip 15 or the handle 13.

The sliding engagement of the rails 20 in the channels 62 of the block 61 or of the latch 60 is optional and may be deleted, and may for a means or device to guide the latch 60 to move relative to the handle 13 or the hand grip 15. The block 61 may be arranged to be snugly engaged and slided in the chamber 17 of the hand grip 15.

It is further to be noted that the lever 40 may be stably and solidly retained in the chamber 17 of the hand grip 15 while the user is holding or grasping the hand grip 15, even when the latch 60 is inadvertently actuated or depressed against the spring 67.

Accordingly, the hacksaw in accordance with the present invention includes an easily operated blade tension device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A hacksaw comprising:
   a frame including a beam having a front portion and a rear portion, a leg and a handle extended downward from said front portion and said rear portion of said beam respectively, said handle including an upper portion and a lower portion and including a chamber formed therein, an arm including a front portion pivotally secured to said lower portion of said handle, and including a rear portion having an oblong hole formed therein, a saw blade detachably coupled between said leg and said front portion of said arm, a lever including an upper portion pivotally secured to said upper portion of said handle with a pivot shaft, and including a lower portion, and including an upper and front portion, a tension rod including an upper portion pivotally secured to said upper and front portion of said lever with a pivot pole, and including a lower portion extended through said oblong hole of said arm and engageable with said rear portion of said arm, said tension rod being movable up and down relative to said handle by rotating said lever inward and outward of said chamber of said handle about said pivot shaft, a latch including a block slidably received in said chamber of said handle, and having an orifice formed therein for slidably receiving said tension rod, and means for biasing said latch to engage with said lever and to retain said lever in said chamber of said handle.

2. The hacksaw according to claim 1, wherein said biasing means includes a spring engaged between said block and said rear portion of said arm.

3. The hacksaw according to claim 1 further comprising a stop attached onto said tension rod and engageable with said block of said latch, for limiting said block of said latch to move relative to said tension rod.

4. The hacksaw according to claim 1, wherein said handle includes a pair of plates for defining said chamber thereof between said plates, and means for guiding said latch to move relative to said handle.

5. The hacksaw according to claim 4, wherein said guiding means includes at least one rail provided on said plates, and at least one channel formed in said block for slidably receiving said at least one rail.

6. The hacksaw according to claim 1, wherein said lower portion of said lever includes a lock notch formed therein, said latch includes an upper portion having a catch provided thereon for engaging with said lock notch of said lever.

7. The hacksaw according to claim 1, wherein said lower portion of said lever includes a lock tongue provided thereon, said latch includes an upper portion having a lock recess formed therein for receiving said lock tongue of said lever.

8. The hacksaw according to claim 1, wherein said lower portion of said tension rod includes an outer thread formed thereon, and a fastener threaded to said outer thread of said tension rod and engageable with said rear portion of said arm.

* * * * *